US008217907B2

(12) United States Patent
Kim et al.

(10) Patent No.: US 8,217,907 B2
(45) Date of Patent: Jul. 10, 2012

(54) MOBILE TERMINAL AND CONTROLLING METHOD THEREOF

(75) Inventors: Tae Hun Kim, Seoul (KR); Han Su Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 772 days.

(21) Appl. No.: 12/119,938

(22) Filed: May 13, 2008

(65) Prior Publication Data

US 2009/0109184 A1 Apr. 30, 2009

(30) Foreign Application Priority Data

Oct. 24, 2007 (KR) .................. 10-2007-0107249

(51) Int. Cl.
*G06F 3/041* (2006.01)
(52) U.S. Cl. ........................................ 345/173
(58) Field of Classification Search ............... 345/173
See application file for complete search history.

(56) References Cited

U.S. PATENT DOCUMENTS

| 5,303,388 | A | * | 4/1994 | Kreitman et al. ............. 715/836 |
| 5,724,492 | A | * | 3/1998 | Matthews et al. ............. 345/419 |
| 5,745,100 | A |   | 4/1998 | Bates et al. |
| 6,363,404 | B1 | * | 3/2002 | Dalal et al. .................... 715/201 |
| 2002/0044154 | A1 |   | 4/2002 | Baar et al. |
| 2003/0016247 | A1 |   | 1/2003 | Lai et al. |
| 2003/0043114 | A1 | * | 3/2003 | Silfverberg et al. .......... 345/157 |
| 2003/0164861 | A1 |   | 9/2003 | Barbanson et al. |
| 2003/0179189 | A1 | * | 9/2003 | Lira .............................. 345/173 |
| 2007/0070066 | A1 | * | 3/2007 | Bakhash ....................... 345/419 |
| 2007/0208704 | A1 |   | 9/2007 | Ives |

FOREIGN PATENT DOCUMENTS

| AU | 2007100827 |   | 9/2007 |
| EP | 0547993 |   | 6/1993 |
| EP | 547993 A2 | * | 6/1993 |
| GB | 2425700 |   | 11/2006 |
| GB | 2425700 A | * | 11/2006 |
| WO | 2006/067620 |   | 6/2006 |
| WO | 2006/105158 |   | 10/2006 |

* cited by examiner

*Primary Examiner* — Amare Mengistu
*Assistant Examiner* — Jennifer Zubajlo
(74) *Attorney, Agent, or Firm* — Lee, Hong, Degerman, Kang & Waimey

(57) ABSTRACT

A mobile terminal and a method of controlling the mobile terminal are provided. Specifically, zooming in/out or shifting a display screen is facilitated. The mobile terminal includes a touchscreen for displaying a webpage including a plurality of areas, a wireless communication unit for accessing the Internet, and a control unit for shifting the displayed webpage in response to touching a first point of the displayed webpage and dragging from the first point to a second point on the displayed webpage, when the displayed webpage is shifted in a direction of the dragging.

23 Claims, 10 Drawing Sheets

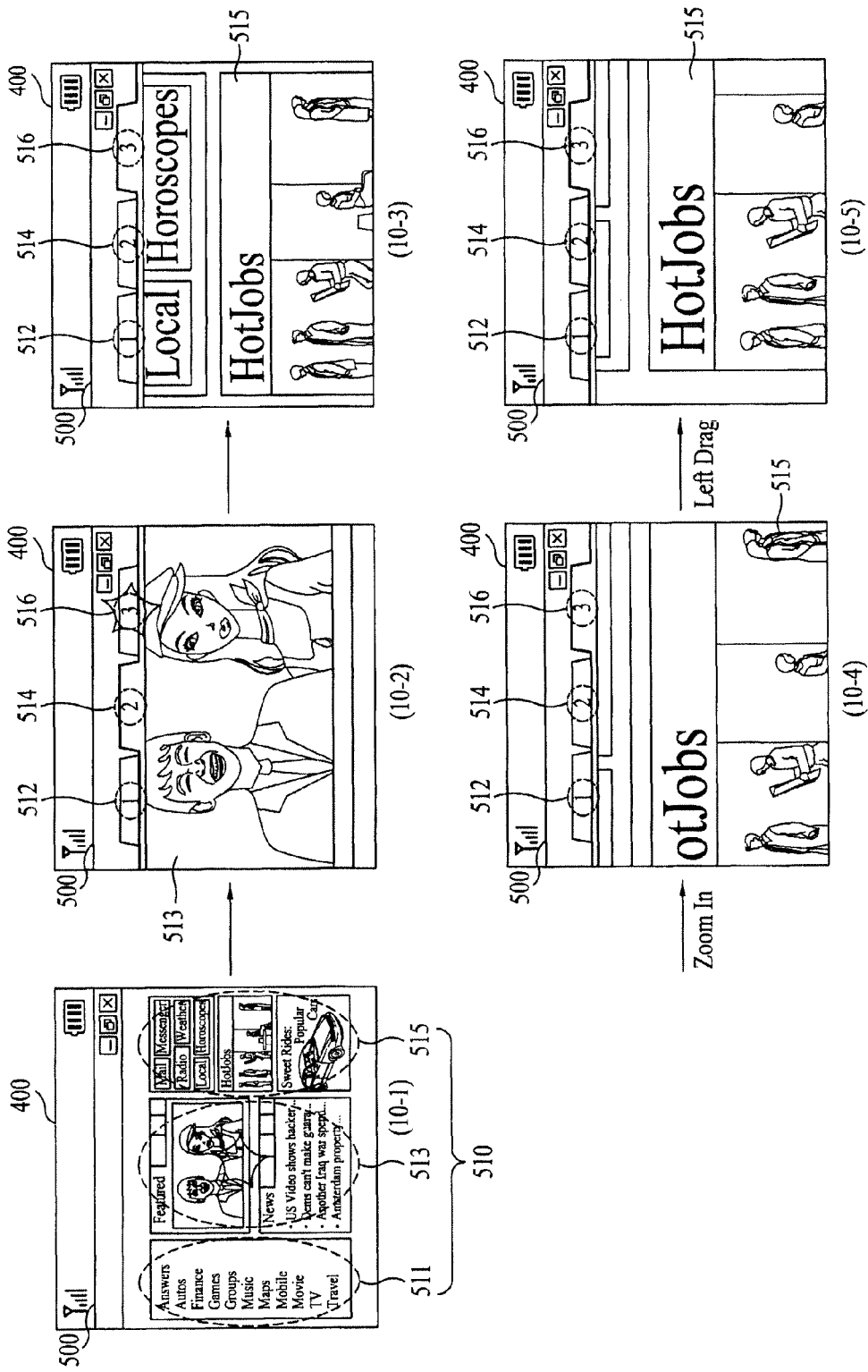

MOBILE TERMINAL AND CONTROLLING METHOD THEREOF

Pursuant to 35 U.S.C. §119(a), this application claims the benefit of earlier filing date and right of priority to Korean Application No. 10-2007-0107249, filed on Oct. 24, 2007, the contents of which are hereby incorporated by reference herein in their entirety.

FIELD OF THE INVENTION

The present invention relates to a mobile terminal and a method of controlling the mobile terminal. Specifically, the present invention relates to zooming in/out and shifting of a webpage displayed on a display screen of the mobile terminal.

DESCRIPTION OF THE RELATED ART

A mobile terminal is a device which may be configured to perform various functions. Examples of such functions include data and voice communications, capturing images and video via a camera, recording audio, playing music files via a speaker system, and displaying images and video on a display. Some terminals include additional functions, such as playing games and reproducing multimedia data. More recently, mobile terminals have been configured to receive broadcast and multicast signals which permit viewing of content, such as videos and television programs.

Enhanced processing capability of the recent mobile terminals allows display of large-size visual information, such as full website image, on a display screen. However, due to the limited size of the display screen of the mobile terminal, the visual information is displayed as a small image of high resolution. Hence, a terminal user needs to zoom-in or zoom-out or scroll down and up frequently to view the visual information properly on the display screen.

SUMMARY OF THE INVENTION

The present invention is directed to a mobile terminal and controlling method thereof that substantially obviate one or more problems due to limitations and disadvantages of the related art.

One aspect of the present invention is to provide a mobile terminal which includes a touchscreen for displaying a webpage including a plurality of areas, a wireless communication unit for accessing the Internet, and a control unit for shifting the displayed webpage in response to touching a first point of the displayed webpage and dragging from the first point to a second point on the displayed webpage, wherein the displayed webpage is shifted in a direction of the dragging.

The control unit shifts the displayed webpage from a first area to a second area according to the direction of the dragging if a distance from the first point to the second point is equal to or greater than a predetermined distance. The control unit shifts the displayed webpage according to the direction of the dragging within a boundary of an area including the first point if a distance from the first point to the second point is less than a predetermined distance.

The control unit may further zoom the displayed webpage in and out. The plurality of areas may be configured as a column structure with each of the plurality of areas displayed in a different column.

Another aspect of the present invention is to provide a mobile terminal which includes a touchscreen for displaying a web browser configured as a polyhedron structure comprising a plurality of facets, each of the plurality of facets displaying a different webpage, a wireless communication unit for accessing the Internet, and a control unit for controlling webpages displayed on the plurality of facets in response to touching and dragging on the touchscreen. Preferably, the polyhedron structure is a hexahedron.

An enlarged version of a webpage may be displayed in response to an input. The control unit rotates the polyhedron structure to display a different one of the plurality of facets in response to touching and dragging on the touchscreen, the rotation in a direction of the dragging. The control unit rotates the polyhedron structure in a direction of the dragging if a dragged distance is equal to or greater than a predetermined distance. The control unit shifts the displayed webpages within a boundary of one of the plurality of facets in a direction of the dragging if a dragged distance is less than a predetermined distance.

Yet another aspect of the present invention is to provide a mobile terminal which includes a touchscreen for displaying a webpage comprising a plurality of columns on a column-by-column basis and displaying selectors assigned to each of the plurality of columns, a wireless communication unit for accessing the Internet, and a control unit for controlling the selectors to select a column for display.

The control unit controls the selectors such that they are displayed as tabs. Preferably, each of the tabs is displayed near a corresponding column. The control unit shifts the displayed column in a direction of dragging in response to touching and dragging applied to the touchscreen.

Yet another aspect of the present invention is to provide a method of controlling a mobile terminal which includes displaying a webpage comprising a plurality of defined areas on a touchscreen and shifting the displayed webpage in response to touching and dragging on the touchscreen such that the displayed webpage is shifted in a direction of the dragging.

Preferably, the plurality of defined areas are a plurality of columns and each of the plurality of defined areas is displayed in a corresponding column. The method may further include displaying an enlarged view of a specific area when one of the plurality of defined areas is selected.

The displayed webpage is shifted from a first of the plurality of defined areas to a second of the plurality of defined areas if a dragged distance is equal to or greater than a predetermined distance. The displayed webpage is shifted in a direction from a first point to a second point within a boundary of one of the plurality of defined areas if a dragged distance is less than a predetermined distance.

Yet another aspect of the present invention is to provide a method of controlling a mobile terminal which includes displaying a webpage comprising a plurality of columns on a touchscreen, displaying a plurality of selectors for selecting each of the plurality of the columns by assigning each of the plurality of the selectors to a corresponding one of the plurality of columns, and displaying one of the plurality of columns in response to selection of one of the plurality of selectors.

Yet another aspect of the present invention is to provide a method of controlling a mobile terminal which includes displaying a web browser on a touchscreen, the web browser configured as a polyhedron structure comprising a plurality of facets, each of the plurality of facets displaying a different webpage, receiving a touch on a first point of the touch screen, the touch dragged from the first point to a second point on the touchscreen, and displaying a webpage displayed on one of the plurality of facets in response to the received touch.

It is to be understood that both the foregoing general description and the following detailed description of the present invention are exemplary and explanatory and are intended to provide further explanation of the invention as claimed.

BRIEF DESCRIPTION OF THE DRAWINGS

The above and other features and advantages of the present invention will become more apparent by describing in detail preferred embodiments thereof with reference to the attached drawings.

FIG. 10 is a diagram illustrating a display screen on which the method illustrated in FIG. 9 is implemented.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
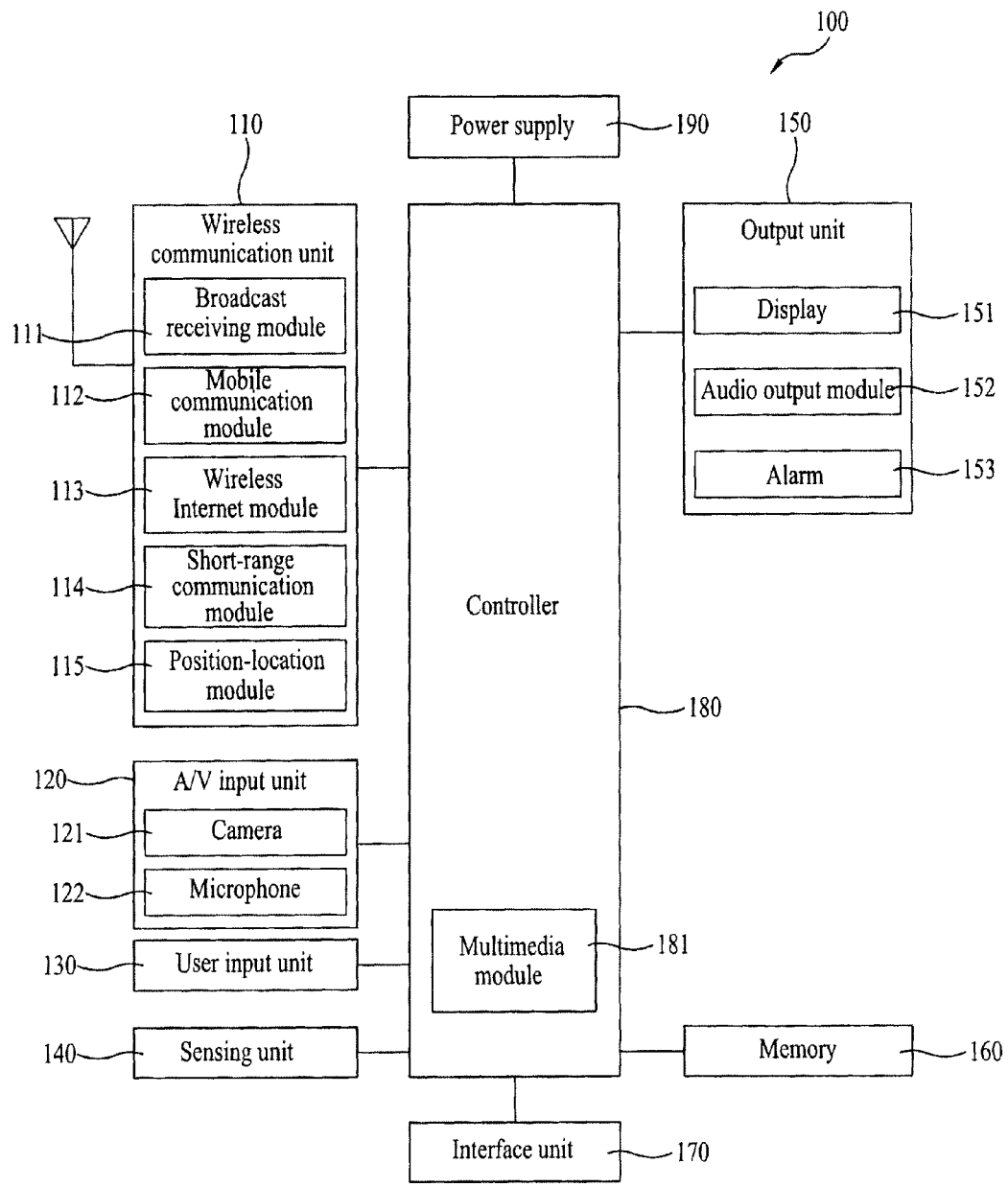
FIG. 1 is a block diagram of a mobile terminal in accordance with an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system which transmits a broadcast signal and/or broadcast associated information.

Examples of the broadcast associated information include information associated with a broadcast channel, a broadcast program, and a broadcast service provider. For example, the broadcast associated information may include an electronic program guide (EPG) of digital multimedia broadcasting (DMB) or an electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as a memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as BLUETOOTH® and Zigbee®.

The position-location module 115 identifies or otherwise obtains the location of the mobile terminal 100. The position-location module 115 may be implemented using global positioning system (GPS) components which cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video. The microphone 122 receives an external audio signal while the portable device is in a particular mode, such as phone call mode, recording mode or voice recognition mode. This audio signal is processed and converted into digital data.

The portable device, and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones 122 and/or cameras 121 may be used.

The user input unit 130 generates input data responsive to user manipulation of an associated input device or devices. Examples of such devices include a keypad, a dome switch, a touchpad such as a static pressure/capacitance, a jog wheel and a jog switch. A specific example is a user input unit 130 configured as a touchpad in cooperation with a touch screen display, which will be described in more detail below.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal a presence or absence of user contact with the mobile terminal, or the orientation or acceleration/deceleration of the mobile terminal.

The sensing unit 140 may sense whether a sliding portion of the mobile terminal 100 is open or closed if the mobile terminal is configured as a slide-type mobile terminal. The sensing unit 140 may also sense the presence or absence of power provided by the power supply 190, and the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video, and pictures. The interface unit 170 may be configured using a wired/wireless data port, audio input/output ports, video input/output ports, or a card socket for coupling to a memory card, a subscriber identity module (SIM) card, a user identity module (UIM) card, or a removable user identity module (RUIM) card).

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage device.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
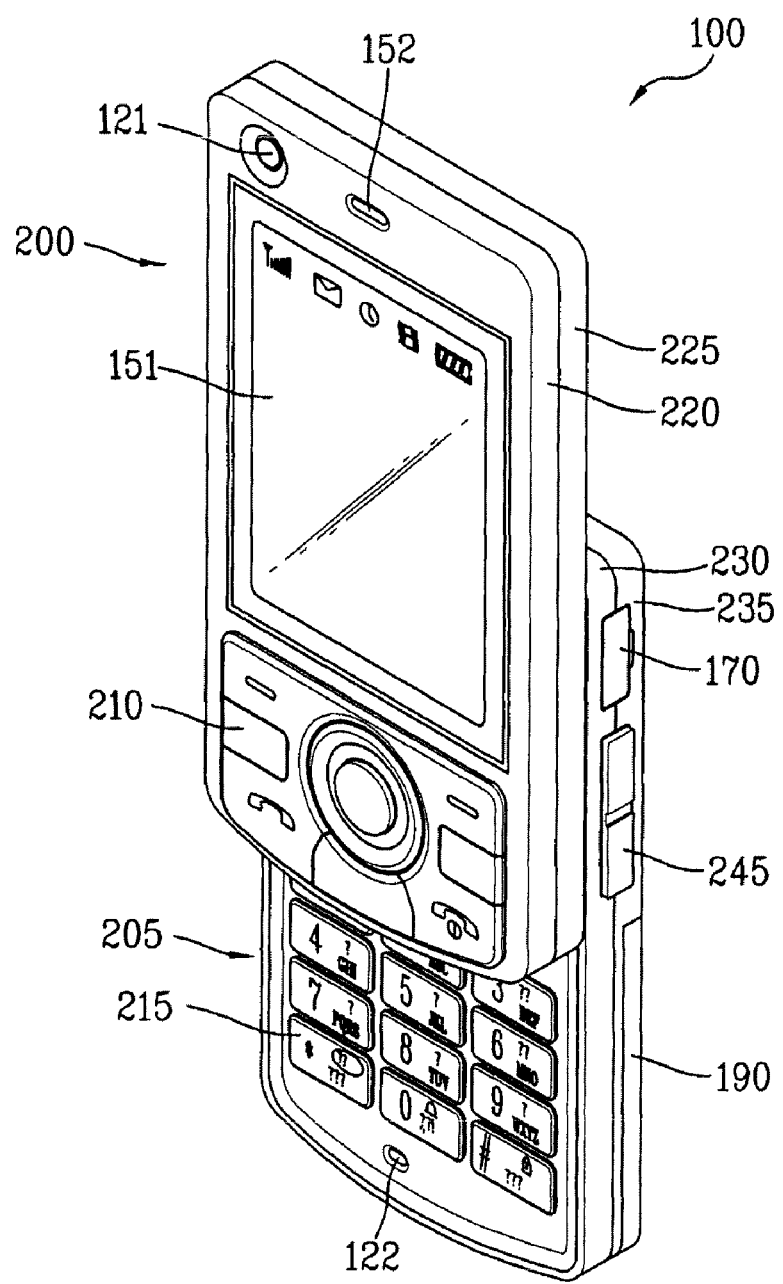
FIG. 2 is a perspective view of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The first case 230 and second case 235 are usually formed of a suitably rigid material, such as injection molded plastic, or formed using metallic material, such as stainless steel (STS) and titanium (Ti).

One or more intermediate cases may be provided between the first case 225 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
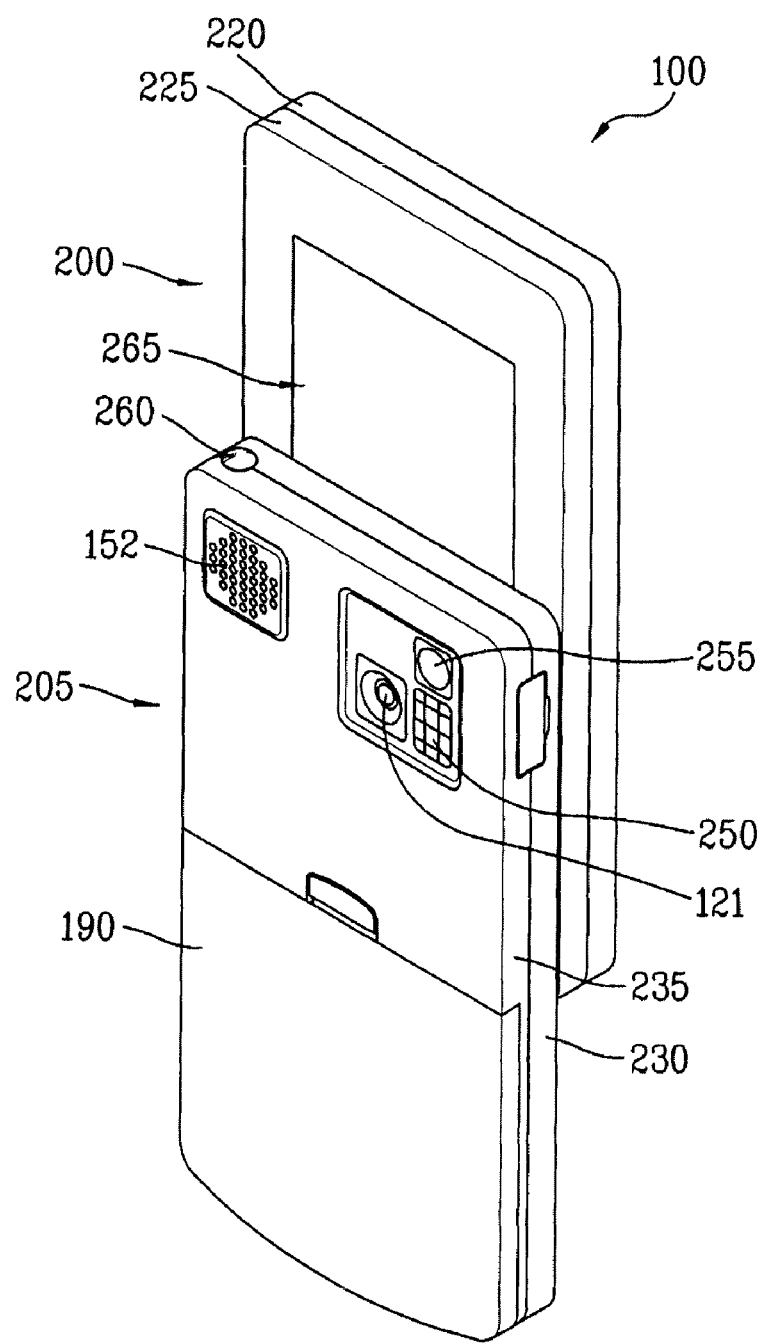
FIG. 3 is a rear view of the mobile terminal shown in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may alternatively be implemented on the other body. Further, the location and relative positioning of the components are not critical and, therefore, the components may be positioned at locations which differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
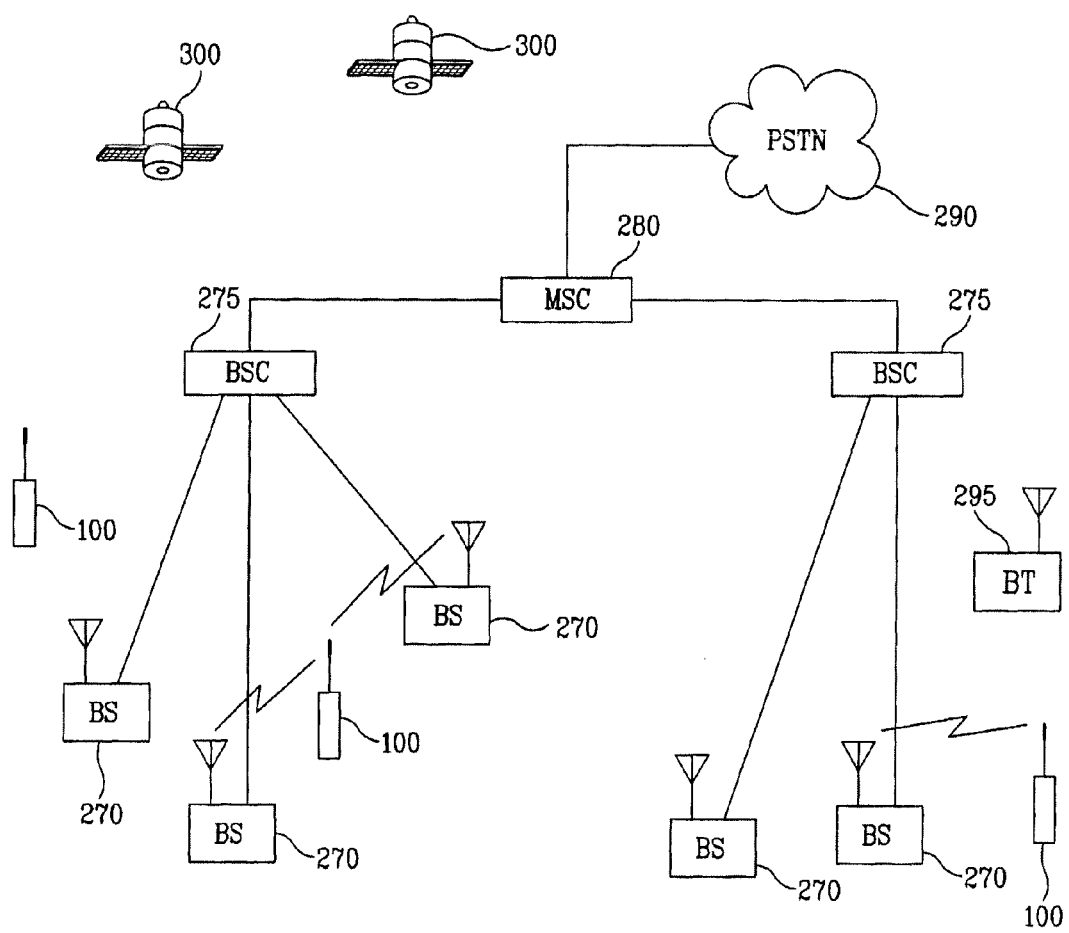
FIG. 4 is a block diagram of a CDMA (code division multiple access) wireless communication system operable with the mobile terminal of FIGS. 1-3.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

Hereinafter, embodiments for a controlling method applicable to the above-configured mobile terminal 100 are explained. It is understood that the following embodiments may be used independently or may be combined. In the following description, it is assumed that the display 151 includes a touchscreen.

A method of controlling a mobile terminal 100 according to a first embodiment of the present invention is described with reference to FIG. 5 and FIG. 6 as follows. Referring to FIG. 6-1, an Internet web browser 500 is displayed on the display screen 400. An Internet webpage 510 is displayed in the web browser 500 (S51).

The Internet webpage 510 includes a plurality of areas. In FIG. 6-1, the Internet webpage 510 has a column structure including a first column 511, a second column 513, and a third column 515.

Alternatively, the Internet webpage 510 may be configured to have different structures other than the column structure. For example, the Internet webpage 510 may have a grid structure (not shown) or a row structure (not shown).

Referring to FIG. 6-2, the display screen 400 is zoomed in to enlarge a portion of the view of the second column 513 (S52). Zoom-in may be executed in response to touching the second column 513 or by manipulating the user input unit 130.

Subsequently, the terminal user touches the display screen 400 when the enlarged view of the second column 513 is displayed on the display screen 400. Specifically, the user touching one point on the webpage 510 and then drags in one direction arriving at another point on the webpage 510 (S53). The control unit then determines whether the dragged distance is greater than a predetermined length (S54).

The webpage 510 on the display screen 400 is shifted toward the dragging direction within a boundary of the second column 513 (S55) as shown in FIGS. 6-3 and 6-4, if the dragged distance is less than or equal to the predetermined length. On the other hand, the webpage 510 on the display screen 400 is shifted toward the dragging direction from the second column 513 to a neighboring column (S56), as shown in FIGS. 6-5 and 6-5 if the dragged distance is greater than the predetermined length.

Referring to FIG. 6-3, the webpage 510 is shifted leftward within the boundary of the second column 513 if touching and dragging involves a left-directional short drag. Referring to FIG. 6-4, the webpage 510 is shifted rightward within the boundary of the second column 513 if touching and dragging involves a right-directional short drag.

Figure 5:
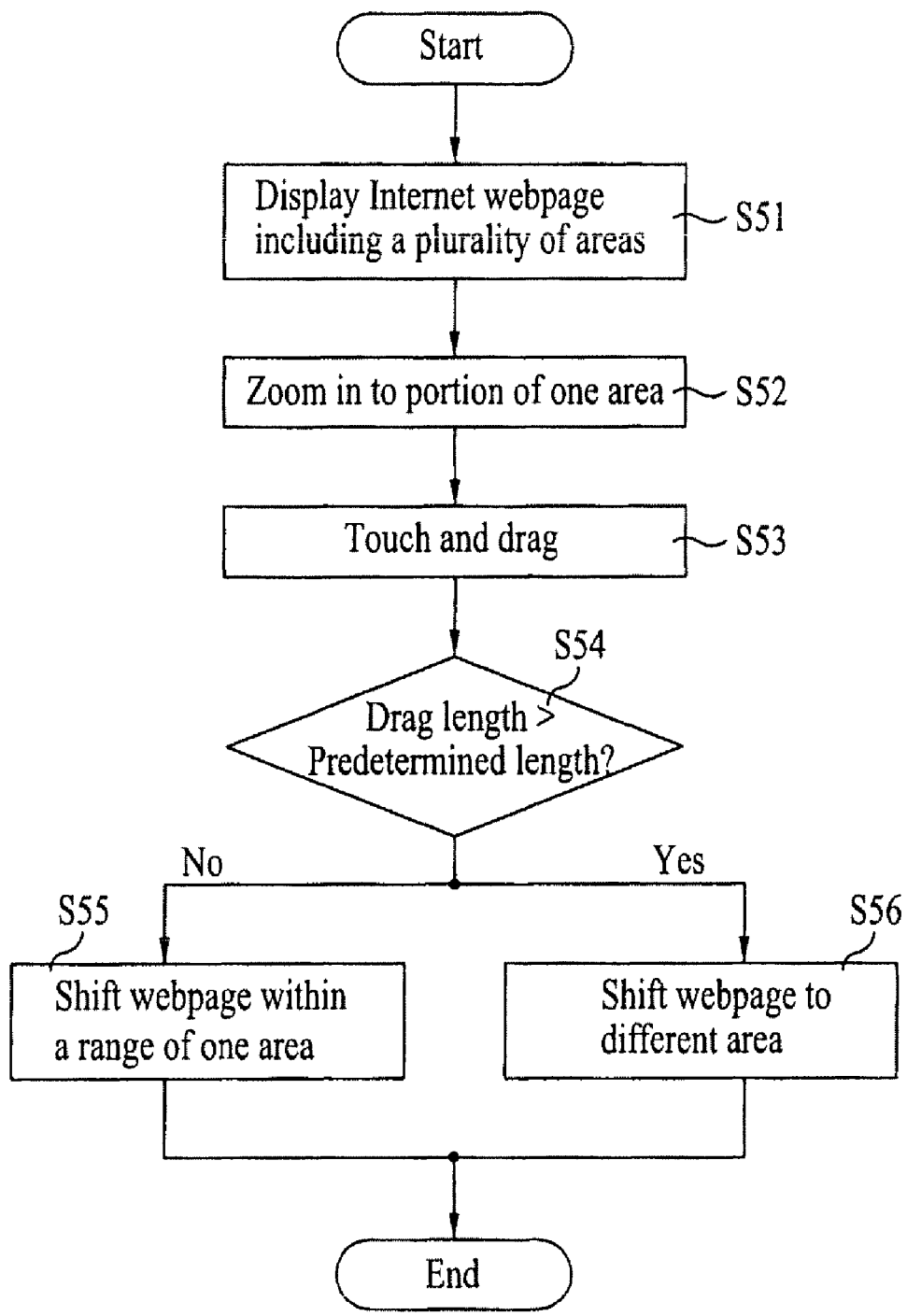
FIG. 5 is a flowchart illustrating a method of controlling a mobile terminal according to an embodiment of the present invention.
Figure 6:
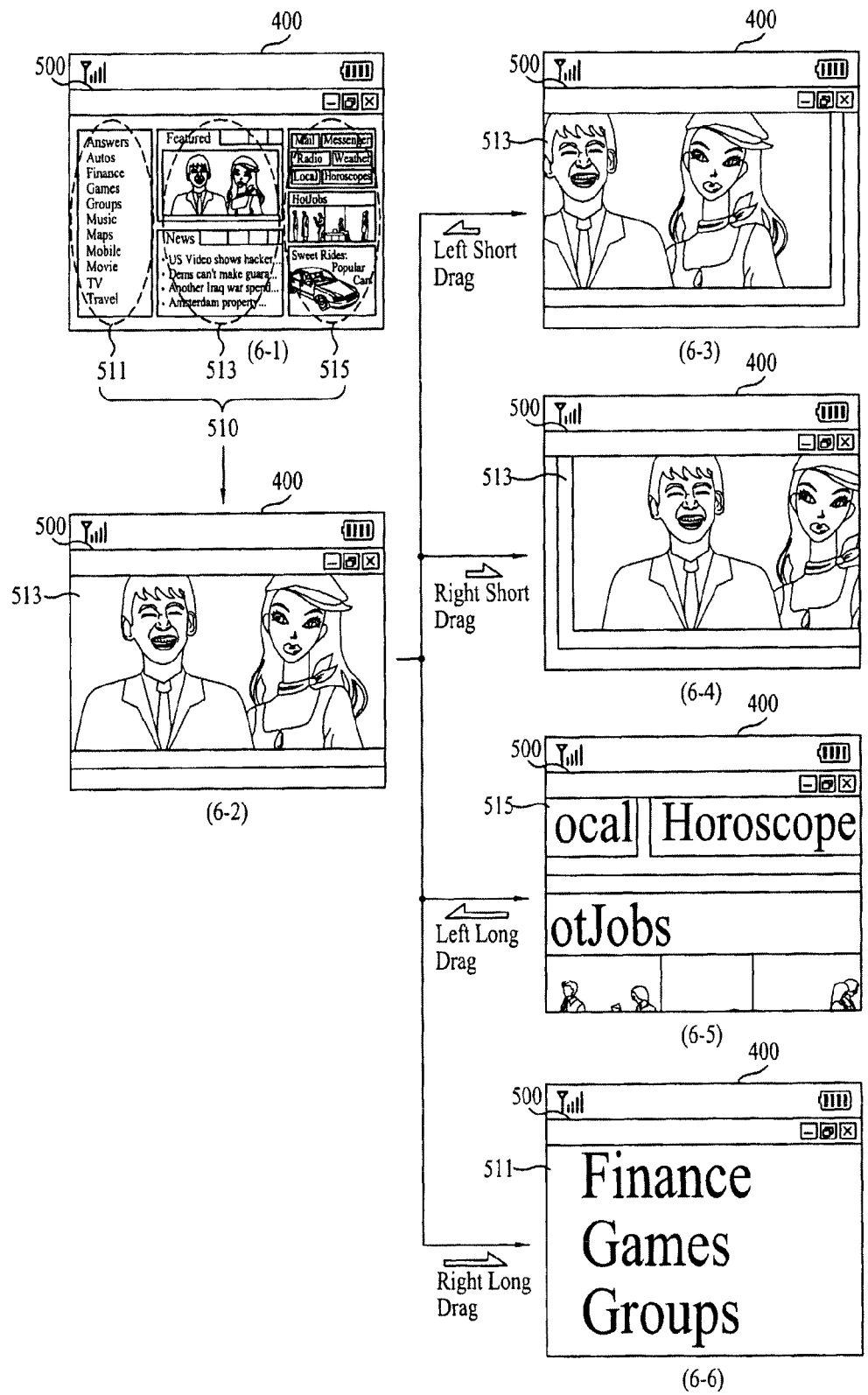
FIG. 6 is a diagram illustrating a display screen on which the method illustrated in FIG. 5 is implemented.

Referring to FIG. 6-5, the webpage 510 is shifted to the third column 515 positioned at the right side of the second column 513 if touching and dragging involves a left-directional long drag. Referring to FIG. 6-6, the webpage 510 is shifted to the first column 511 positioned at the left side of the second column 513 if touching and dragging involves a right-directional long drag.

Therefore, the terminal user is able to move to a desired area of the Internet webpage 510 easily and quickly. The user can view any area of the Internet webpage 510 on the size-limited display screen 400 of the mobile terminal 100 without having to zoom-in/out or scroll the webpage frequently.

Figure 7:
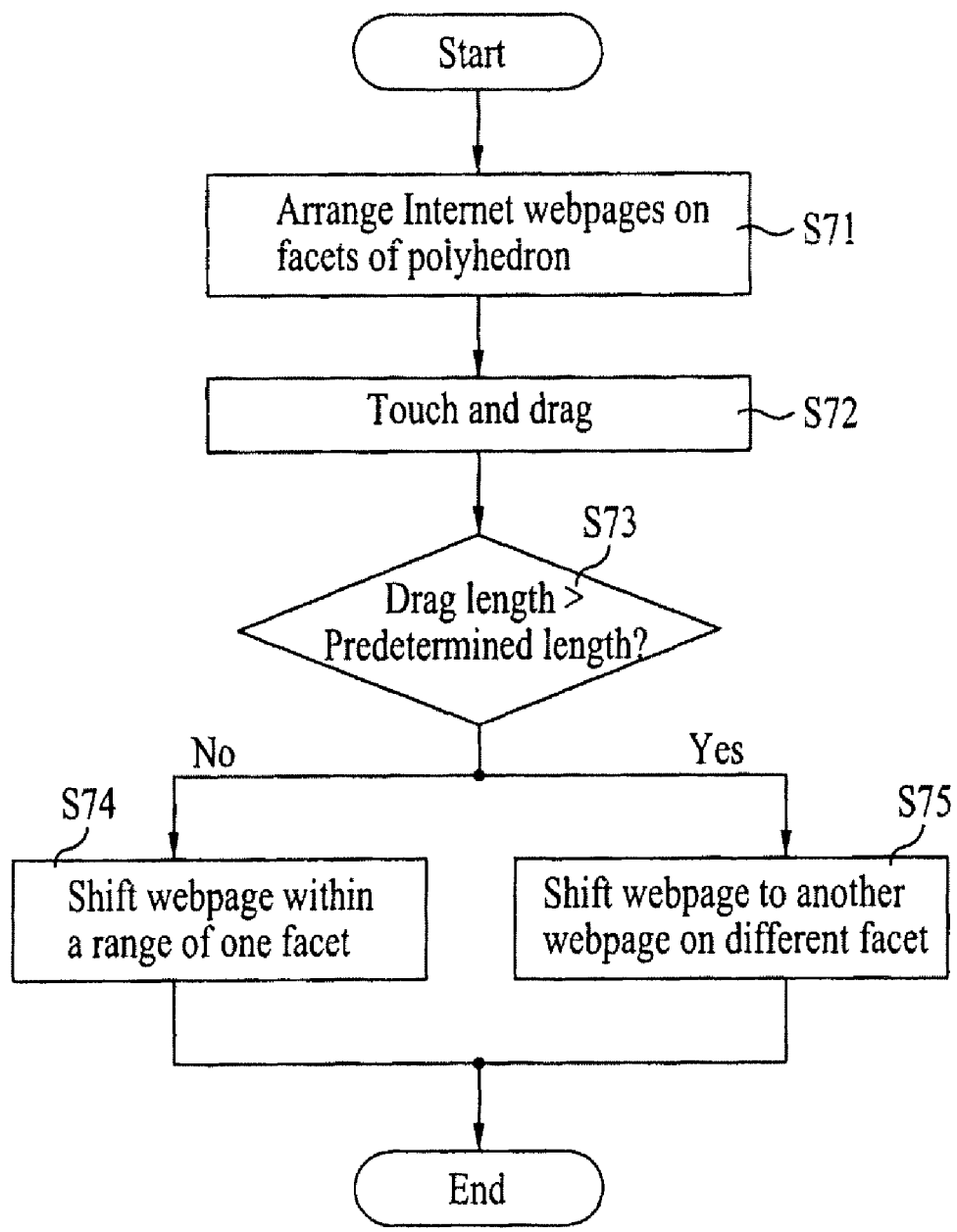
FIG. 7 is a flowchart illustrating a method of controlling a mobile terminal according to another embodiment of the present invention.

A method of controlling a mobile terminal 100 according to a second embodiment of the present invention is described with reference to FIG. 7 and FIG. 8. A web browser for browsing Internet webpages may be configured in a polyhedral shape instead of a plane shape in order to display different webpages on a plurality of facets of the polyhedron.

Figure 8:
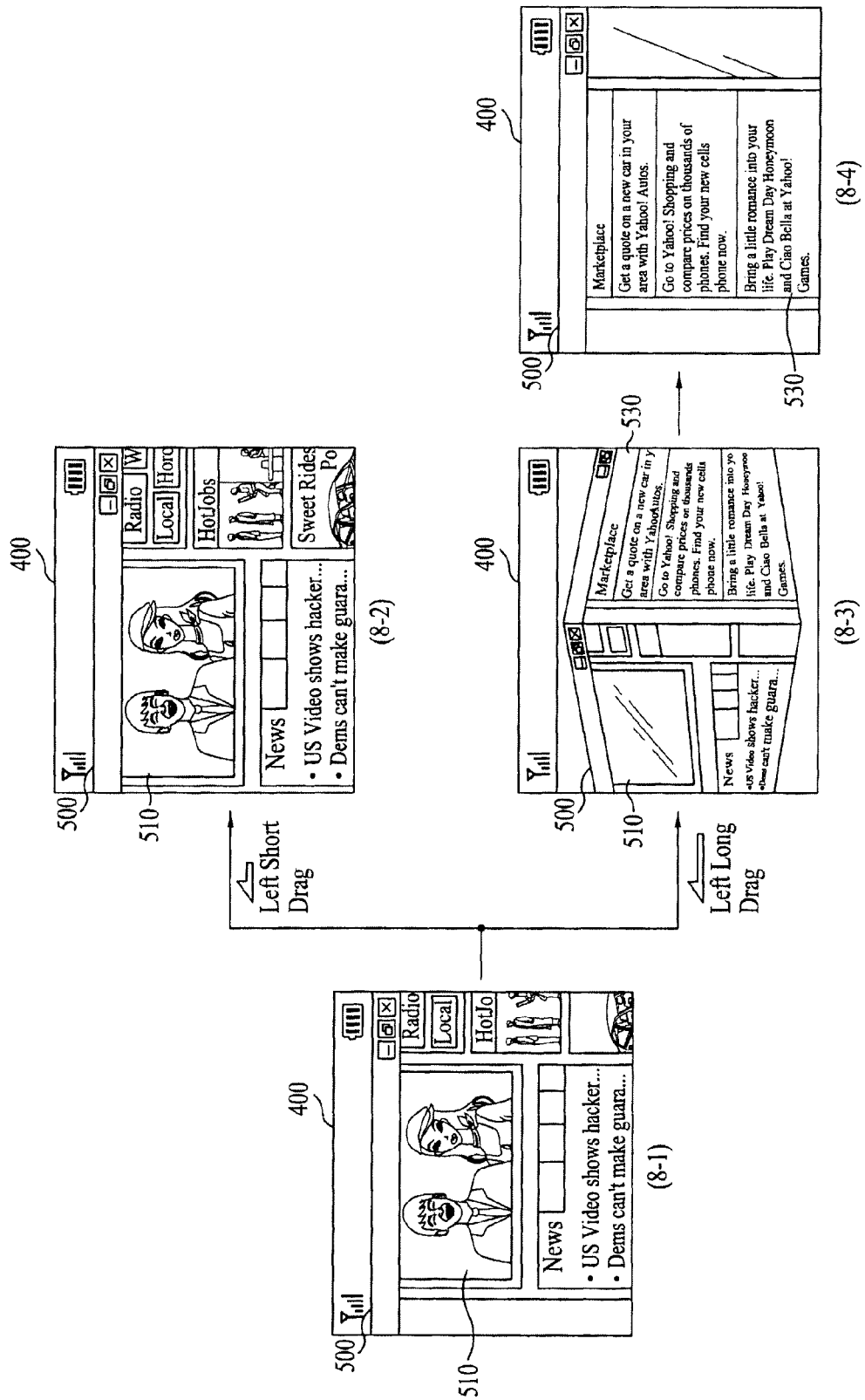
FIG. 8 is a diagram illustrating a display screen on which the method illustrated in FIG. 6 is implemented.

Referring to FIG. 8-1, a polyhedral web browser 500 is displayed on the display screen 400 of the mobile terminal 100. A plurality of webpages are displayed on the plurality of facets of the polyhedron (S71). FIG. 8-1 illustrates a first webpage 510 among the plurality of webpages displayed on the polyhedron.

Subsequently, the terminal user touches and then drags on the display screen 400 in one direction (S72). The control unit then determines whether the dragged distance is greater than a predetermined length (S73).

The first Internet webpage 510 on the display screen 400 is shifted within a boundary of the first Internet webpage toward the dragging direction (S74), as shown in FIG. 8-2, if the dragged distance is less than or equal to the predetermined length. On the other hand, the first Internet webpage 510 in the polyhedral browser is rotated such that the first webpage disappears from the display screen 400 and is replaced by second webpage 530 on a different facet of the polyhedron in a direction of the dragging direction (S75), as shown in FIGS. 8-3 and 8-4, if the dragged distance is greater than the predetermined length.

The rotating direction of the browser is not limited to one direction. As shown in FIGS. 8-3 and 8-4, the browser may be a hexahedron. Alternatively, the browser may include other types of polyhedrons.

In the above description, a plurality of webpages are displayed on a plurality of facets of the polyhedral web browser. However, implementations of the present embodiment are not so restricted. For example, the plurality of the areas may be configured for display on the plurality of facets of the polyhedral web browser when an Internet webpage including a plurality of areas, such as columns, is displayed.

Figure 9:
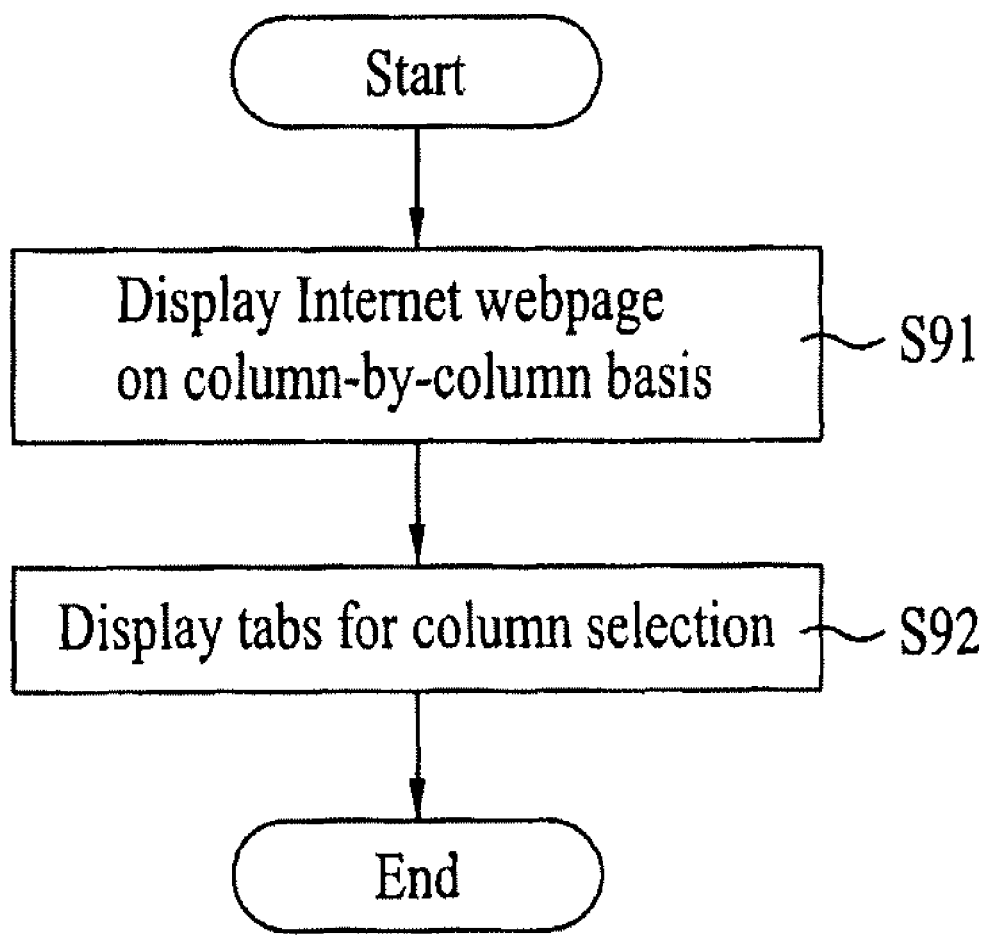
FIG. 9 is a flowchart illustrating a method of controlling a mobile terminal according to yet another embodiment of the present invention.

A method of controlling a mobile terminal 100 according to another embodiment of the present invention is described with reference to FIG. 9 and FIG. 10. Referring to FIG. 10-1, an Internet web browser 500 is displayed on the display screen 400 of the mobile terminal 100 on a column-by-column basis.

An Internet webpage is displayed in the web browser 500 (S91). The Internet webpage 510 has a column structure including a first column 511, a second column 513, and a third column 515.

The mobile terminal 100 may be configured to select a column in response to touching a specific column in the webpage 510 or by manipulating the user input unit 130. Alternatively, a selector may be provided for each of the columns 511, 513, 515 to facilitate selection of a specific column (S92), as shown in FIG. 10-2. The selector includes first to third tabs 512, 514 and 516 assigned to the columns 511, 513 and 515, respectively.

For example, the third column 515 is displayed in the Internet web browser 500, as shown in FIG. 10-3, if the terminal user touches the third tab 516. A different column may be selected and displayed on the display screen 400 by touching a different tab at any time.

Referring to FIG. 10-4, the terminal user is able to view any part of the third column 515 if the third column displayed on the display screen 400 is zoomed in by touching any point on the display area of the web browser 500 and then dragging the touched point in a desired direction. The resulting display is shown in FIG. 10-5.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal, comprising:
   a touchscreen configured to display a webpage including a plurality of areas;
   a wireless communication unit configured to access the Internet; and
   a control unit configured to:
      cause the touchscreen to display at least a portion of a first area among the plurality of areas of the webpage in response to a first touch input received at the first area while the plurality of areas of the webpage are displayed, the first area zoomed-in in response to the first touch input;
      shift the displayed webpage in response to a second touch input received while only the first area of the webpage is displayed on the touchscreen, the second touch input comprising touching a first point of the displayed first area of the webpage and dragging from the first point to a second point on the displayed first area of the webpage
      shift the displayed webpage from the first area to a second area or a third area according to a direction of the dragging after determining that a dragged distance from the first point to the second point is greater than a predetermined distance such that only the second area of the webpage is displayed in response to the dragging in a first direction and only the third area of the webpage is displayed in response to the dragging in a second direction; and
      shift the displayed webpage within a boundary of the first area including the first point according to the direction of the dragging after determining that the dragged distance is equal to or less than the predetermined distance such that a first different portion of the first area is displayed on the touchscreen in response to the dragging in a third direction and a second different portion of the first area is displayed on the touch screen in response to the dragging in a fourth direction when the touchscreen is not touched after the dragging.

2. The mobile terminal of claim 1, wherein the control unit further zooms the displayed webpage in and out.

3. The mobile terminal of claim 1, wherein the plurality of areas is configured as a column structure with each of the plurality of areas displayed in a different column.

4. The mobile terminal of claim 1, wherein the second area and the third area of the webpage are not displayed on the touchscreen when the first area is zoomed-in in response to the first touch input received at the first area while the first, second, and third areas of the webpage are displayed together.

5. A mobile terminal comprising:
   a touchscreen configured to display a web browser configured as a polyhedron structure comprising a plurality of facets, each of the plurality of facets displaying a different webpage;
   a wireless communication unit configured to access the Internet; and
   a control unit configured to:
      cause the touchscreen to display a first webpage on a first facet of the polyhedron structure;

control the webpage displayed on each of the plurality of facets in response to touching and dragging on the touchscreen rotate the polyhedron structure to display a different one of the plurality of facets in response to the touching and dragging on the touchscreen after determining that a dragged distance is greater than a predetermined distance, the dragging comprising touching a first point of the displayed first webpage and dragging from the first point to a second point on the displayed first webpage, wherein the different one of the plurality of facets displays a second webpage in response to the dragging in a first direction and displays a third webpage in response to the dragging in a second direction, and shift the displayed first webpage within a boundary of the first facet in a direction of the dragging after determining that the dragged distance is equal to or less than the predetermined distance such that a first portion of the first webpage is displayed on the first facet in response to the dragging in a third direction and a second portion of the first webpage is displayed on the first facet in response to the dragging in a fourth direction when the touchscreen is not touched after the dragging.

6. The mobile terminal of claim 5, wherein an enlarged version of a webpage is displayed in response to an input.

7. The mobile terminal of claim 5, wherein the control unit is further configured to rotate the polyhedron structure in a direction of the dragging.

8. The mobile terminal of claim 5, wherein the polyhedron structure comprises a hexahedron.

9. A mobile terminal, comprising:
a touchscreen configured to display a webpage comprising a plurality of columns on a column-by-column basis and displaying a plurality of selectors assigned to each of the plurality of columns, wherein the plurality of selectors are not displayed while the plurality of columns of the webpage are displayed concurrently on the touchscreen;
a wireless communication unit configured to access the Internet; and
a control unit configured to:
  cause the touchscreen to display a first column of the webpage when the first column is selected among the plurality of columns;
  cause the touchscreen to display the plurality of selectors when the selected first column of the webpage is displayed;
  control the selectors to select a column of the displayed webpage for display;
  shift the displayed first column in a direction of dragging in response to touching and dragging applied to the touchscreen,
  shift from the first column to a second column, causing the touchscreen to display the second column of the webpage when a second selector is selected among the plurality of selectors while the first column is displayed on the touchscreen, and
  shift from the second column to the first column, causing the touchscreen to display the first column of the webpage when a first selector is selected among the plurality of selectors while the second column is displayed on the touchscreen.

10. The mobile terminal of claim 9, wherein the control unit controls the selectors such that they are displayed as tabs.

11. The mobile terminal of claim 10, wherein each of the tabs is displayed near a corresponding column such that a first tab corresponding to the first selector is positioned near a first position on the touchscreen where the first column was displayed when the plurality of columns of the webpage were displayed concurrently and a second tab corresponding to the second selector is positioned near a second position on the touchscreen where the first column was displayed when the plurality of columns of the webpage were displayed concurrently.

12. The mobile terminal of claim 9, when the first column is selected while the plurality of columns of the webpage are displayed concurrently, the first column is selected in response to touching of the first column.

13. A method of controlling a mobile terminal, the method comprising:
displaying a webpage comprising a plurality of defined areas on a touchscreen;
displaying at least a portion of a first area among the plurality of defined areas of the webpage in response to a first touch input received at the first area while the plurality of defined areas of the webpage are displayed, the first area zoomed-in in response to the first touch input;
shifting the displayed webpage in response to a second touch input received while only the first area of the webpage is displayed on the touchscreen, the second touch input comprising touching a first point of the displayed first area of the webpage and dragging from the first point to a second point on the displayed first area of the webpage;
shifting the displayed webpage from the first area to a second area or a third area after determining that a dragged distance from the first point to the second point is greater than a predetermined distance such that only the second area of the webpage is displayed in response to the dragging in a first direction and only the third area of the webpage is displayed in response to the dragging in a second direction; and
shifting the displayed webpage within a boundary of the first area including the first point according to the direction of the dragging after determining that the dragged distance is equal to or less than the predetermined distance such that a first different portion of the first area is displayed on the touchscreen in response to the dragging in a third direction and a second different portion of the first area is displayed on the touch screen in response to the dragging in a fourth direction when the touchscreen is not touched after the dragging.

14. The method of claim 13, wherein the plurality of defined areas comprises a plurality of columns and each of the plurality of defined areas is displayed in a corresponding column.

15. The method of claim 13, further comprising:
displaying an enlarged view of a specific area when one of the plurality of defined areas is selected.

16. A method of controlling a mobile terminal, the method comprising:
displaying a webpage comprising a plurality of columns on a touchscreen;
displaying a first column of the webpage when the first column is selected among the plurality of columns;
displaying a plurality of selectors each for selecting one of the plurality of the columns by assigning each of the plurality of the selectors to a corresponding one of the plurality of columns when the selected first column of the webpage is displayed, wherein the plurality of selectors are not displayed while the plurality of columns of the webpage are displayed concurrently on the touchscreen;

displaying one of the plurality of columns in response to selection of one of the plurality of selectors;

shifting from a first column to a second column, causing the touchscreen to display the second column of the webpage when a second selector is selected among the plurality of selectors while the first column is displayed on the touchscreen; and shifting from the second column to the first column, causing the touchscreen to display the first column of the webpage when a first selector is selected among the plurality of selectors while the second column is displayed on the touchscreen.

17. A method of controlling a mobile terminal, the method comprising:

displaying a web browser on a touchscreen, the web browser configured as a polyhedron structure comprising a plurality of facets, each of the plurality of facets displaying a different webpage;

displaying a first webpage on a first facet of the polyhedron structure;

receiving a touch on a first point of the touch screen, the touch dragged from the first point to a second point on the touchscreen;

displaying a webpage displayed on one of the plurality of facets in response to the received touch;

rotating the polyhedron structure to display a different one of the plurality of facets in response to the touching and dragging on the touchscreen after determining that a dragged distance is greater than a predetermined distance, the dragging comprising touching a first point of the displayed first webpage and dragging from the first point to a second point on the displayed first webpage, wherein the different one of the plurality of facets displays a second webpage in response to the dragging in a first direction and displays a third webpage in response to the dragging in a second direction; and shifting the displayed first webpage within a boundary of the first facet in a direction from of the dragging after determining that the dragged distance is equal to or less than the predetermined distance such that a first portion of the first webpage is displayed on the first facet in response to the dragging in a third direction and a second portion of the first webpage is displayed on the first facet in response to the dragging in a fourth direction when the touchscreen is not touched after the dragging.

18. The method of claim 17, further comprising:

displaying an enlarged view of a webpage displayed on one of the plurality of facets on the touchscreen in response to a received input.

19. The method of claim 17, further comprising:

rotating the polyhedron structure in a direction from the first point to the second point in order to move from a first of the plurality of facets to a second of the plurality of facets and displaying a webpage displayed on the first of the plurality of facets.

20. The method of claim 19, wherein the first point is on the first of the plurality of facets and the second point is on the second of the plurality of facets.

21. The method of claim 17, wherein the polyhedron structure comprises a hexahedron.

22. A mobile terminal comprising:

a touchscreen configured to display a web browser configured as a polyhedron structure comprising a plurality of facets, each of the plurality of facets displaying a different area of a same webpage comprising a plurality of defined areas;

a wireless communication unit configured to access the Internet; and a control unit configured to:

cause the touchscreen to display a first defined area of the same webpage on a first facet of the polyhedron structure;

rotate the polyhedron structure to display a different one of the plurality of facets in response to touching and dragging on the touchscreen after determining that a dragged distance is greater than a predetermined distance, the dragging comprising touching a first point on the displayed first defined area and dragging from the first point to a second point on the touchscreen, wherein the different one of the plurality of facets displays a second defined area of the same webpage in response to the dragging in a first direction and displays a third defined area of the same webpage in response to the dragging in a second direction, and shift the displayed first defined area of the same webpage within a boundary of the first facet in a direction of the dragging after determining that the dragged distance is equal to or less than the predetermined distance such that a first portion of the first defined area of the same webpage is displayed on the first facet in response to the dragging in a third direction and a second portion of the first defined area of the same webpage is displayed on the first facet in response to the dragging in a fourth direction when the touchscreen is not touched after the dragging.

23. The mobile terminal of claim 22, wherein the control unit is further configured to cause the touchscreen to display at least two facets of the polyhedron structure at the same time when the polyhedron structure is rotated such that a first facet displays the first defined area of the same webpage and a second facet displays the second defined area of the same webpage at the same time before the rotation is completed.

* * * * *